United States Patent [19]

Douverne

[11] 4,367,550

[45] Jan. 4, 1983

[54] METHOD FOR MONITORING THE BIT ERROR RATE OF A DIGITAL TRANSMISSION SYSTEM

[75] Inventor: Egon Douverne, Backnang, Fed. Rep. of Germany

[73] Assignee: Licentia Patent-Verwaltungs-GmbH, Frankfurt am Main, Fed. Rep. of Germany

[21] Appl. No.: 249,238

[22] Filed: Mar. 30, 1981

[30] Foreign Application Priority Data

Mar. 29, 1980 [DE] Fed. Rep. of Germany ....... 3012400

[51] Int. Cl.$^3$ ...................... G06F 11/00; H03K 13/32
[52] U.S. Cl. ........................................... 371/5; 371/6; 375/34; 375/58
[58] Field of Search ................... 371/5, 6; 375/34, 58; 455/63

[56] References Cited

U.S. PATENT DOCUMENTS

| 3,449,715 | 6/1969 | Brothman et al. | 371/6 |
| 4,034,340 | 7/1977 | Sant'Agostino | 371/22 |
| 4,204,838 | 4/1980 | Poitevin | 371/5 |
| 4,247,938 | 1/1981 | Kurihara et al. | 371/5 |
| 4,309,771 | 1/1982 | Wilkens | 375/58 |

OTHER PUBLICATIONS

Keelty et al., On Line Pseudo-Error Monitors for Digital Transmission Systems, IEEE Trans. on Comm., vol. COM-26, No. 8, Aug. 1978, pp. 1275-1282.
Gooding, Performance Monitor Techniques for Digital Receivers Based on Extrapolation of Error Rates, IEEE Trans. on Comm. Tech., vol. COM-16, No. 3, Jun. 1968, pp. 380-387.
Leon et al., A Bit Error Rate Monitor for Digital PSK Links, IEEE Trans. on Comm., vol. COM-23, No. 5, May 1975, pp. 518-525.
Takenaka et al., Bit Error Rate Monitor for Four Phase PSK System, 1980 Conference on Communications, Seattle, WA, 8-12 Jun. 1980, pp. 2.5.1-2.5.6.

Primary Examiner—Charles E. Atkinson
Attorney, Agent, or Firm—Spencer & Kaye

[57] ABSTRACT

A method for monitoring the bit error rate of digital signals according to the pseudo error rate technique which includes effecting an optimal regeneration of the signal elements in a main signal path by sampling each signal element in that path, and effecting a degraded regeneration of the signal elements in a secondary path. Regeneration in the secondary signal path is carried out by sampling each signal element twice to determine its value, once a fraction of half the element period before the midpoint of the element period and once the same fraction of half the element period after the midpoint of the element period, the two sampling moments being rigidly coupled together in time, comparing the result of each of the two samplings of one element in the secondary signal path with the result of the sampling of the same element in the main signal path, and utilizing the number of disagreements occurring over a given time interval as a measure for the bit error rate in the main signal path.

2 Claims, 4 Drawing Figures

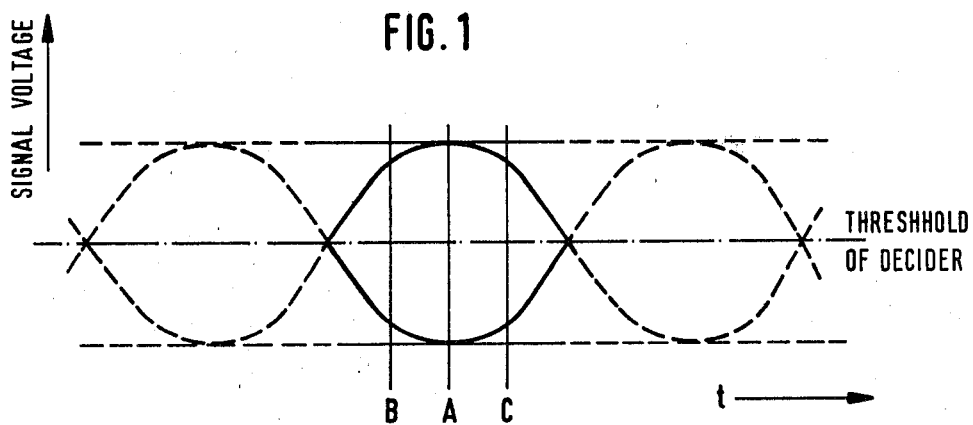
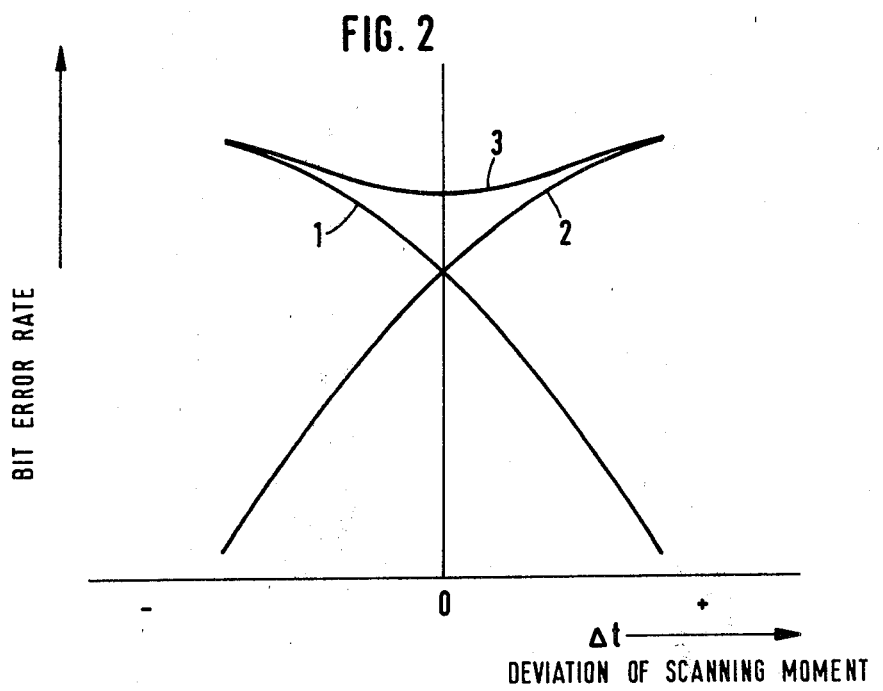

METHOD FOR MONITORING THE BIT ERROR RATE OF A DIGITAL TRANSMISSION SYSTEM

BACKGROUND OF THE INVENTION

The present invention relates to a method for monitoring the bit error rate of a digital signal transmission according to the pseudo error rate technique.

In devices for receiving digital communication signals, apparatus is required to constantly monitor the bit error rate occuring during operation. Such apparatus may serve to actuate an alarm or to switch to a reserve channel when the bit error rate exceeds a given value.

One known method for monitoring the bit error rate is called the pseudo error rate measurement and is disclosed in the CCIR-Report 613-1 Doc. 9/1069-E, Jan. 16, 1978. In this method, the received digital signal on which interfering signals are superposed is regenerated twice: once in the optimum manner for the main signal path; and, in parallel therewith, in a secondary signal path in a manner which results in an intentionally degraded performance and increase in the bit error rate. The output sequences obtained by the different types of regeneration are compared with one another, and the number of disagreements, or noncoinciding signals at the two outputs over a certain time interval constitutes a measure for the bit error rate in the main signal path.

The intentional increase of the bit error rate in the secondary signal path can be obtained by modification of the decision regions of the regenerator; for this purpose one can shift either the thresholds of the decider or the scanning point in time can be shifted with respect to the optimum case.

SUMMARY OF THE INVENTION

It is an object of the present invention to monitor bit error rates according to the pseudo error rate measuring technique which method operates with a shift of the scanning point in time of the regenerator in the secondary signal path in a manner which assures good measuring accuracy and is economical.

The above and other objects are achieved, according to the invention, in a method for monitoring the bit error rate of digital signals according to the pseudo error rate technique which includes effecting an optimal regeneration of the signal elements in a main signal path by sampling each signal element in that path, and effecting a degraded regeneration of the signal elements in a secondary path, by performing the step of effecting regeneration in the secondary signal path by the operations of sampling each signal element twice to determine its value, once a fraction of half the element period before the midpoint of the element period, and once the same fraction of half the element period after the midpoint of the element, the two sampling moments being rigidly coupled together in time, comparing the result of each of the two samplings of one element in the secondary signal path with the result of the sampling of the same element in the main signal path, and utilizing the number of disagreements occurring over a given time interval as a measure for the bit error rate in the main signal path.

The principle of the psuedo error rate measurement and the operation of the arrangement according to the invention will be explained in more detail with the aid of the drawing Figures.

BRIEF DESCRIPTION OF THE DRAWING

FIG. 1 is a pictorial representation of a received signal display used to explain the principles of the invention.

FIG. 2 is a performance diagram illustrating the operating principal of the invention.

DESCRIPTION OF THE PREFERRED EMBODIMENTS

FIG. 1 shows an idealized binary received signal as it appears on the screen of an oscilloscope if, for example, the characters of a random sequence are continuously recorded one on top of the other. Such as representation is generally called an "eye diagram". During actual operation, the received signal is falsified by superposed interfering voltages and distortions so that during the subsequent regeneration characters will occasionally be recognized and reproduced incorrectly. The lowest bit error rate results if the characters are scanned at the moment where the eye is open widest (Point A in FIG. 1). This scanning is therefore suitable for the primary signal path. Small deviations in the moment of scanning have no noticeable influence on the bit error rate since the signal voltage in the vicinity of A has a relatively flat shape.

For scanning in the secondary signal path, points in time B or C are suitable which are shifted with respect to the optimum scanning to the extent that a noticeable increase in the bit error rate occurs. However, this type of scanning is very sensitive to the deviations in the scanning moment from the given position, since the signal voltage in the vicinity of B or C has a relatively steep shape.

FIG. 2 is a qualitative representation of the dependence of the bit error rates on the shift of the scanning moment with respect to B (curve 1) or C (curve 2). This dependence can have the result that the measuring accuracy of the method is impaired to an undue degree. The measuring result may be influenced not only by the unavoidable tolerances of the scanning moment but also by signal jitter and signal distortions.

The basic idea of the present invention is now to utilize the oppositely directed tendencies of the curves 1 and 2 of FIG. 2 to increase the measuring accuracy. For this purpose, each bit in the secondary signal path is scanned twice, once at a fraction of half the bit width before the optimum point in time (corresponding to point B of FIG. 2) and once approximately at the same fraction of half the bit width after the optimum moment in time (corresponding to point C of FIG. 3), both scannings being rigidly coupled in time by means of suitable circuit means so that tolerances will have the same effect on each scanning moment. If now the results of both scannings in the secondary signal path are utilized for the further evaluation, the sum of the bit error rates is determinative. This sum is shown in FIG. 2 as curve 3 and exhibits a significantly lesser dependence on shifts of the scanning moment than curves 1 and 2 of FIG. 2. The dependence of the measuring accuracy on bit jitter and asymmetrical bit distortion—with respect to the center of the bit—is likewise reduced by the dual scanning.

Figure 3:
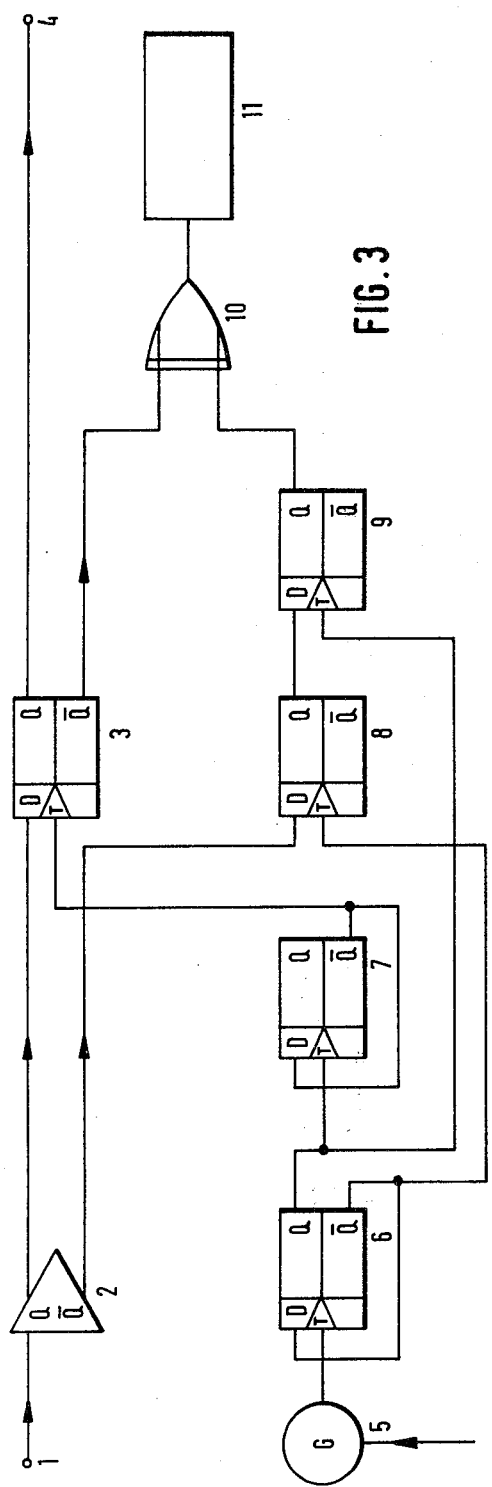
FIG. 3 is a block diagram of a sampling circuit for carrying out a preferred embodiment of the method according to the invention.

A possible implementation of the method according to the invention is shown in FIG. 3.

Received binary signals travel through input 1 to a decider 2 of a known type which converts the more or less distorted character signals into rectangular signals. The binary signals emitted at output Q of the decider 2 are scanned by means of a flip-flop 3 at the optimum moment in time and subsequently fed to output 4. The components described so far form the primary signal path of the circuit.

In the secondary signal path, each bit signal emitted at complement output Q of decider 2 is scanned twice by means of a flip-flop 8, this occuring once almost ¼ of a bit period before and once almost ¼ of a bit period after the optimum moment in time. The results of these scannings are each delayed, by means of a flip-flop 9, by ¼ of a bit period and compared in an anticoincidence circuit 10 with the respective output signal at Q of flip-flop 3. Each noncoincidence causes a pulse to be generated at the output of the circuit 10, and these pulses are fed to the evaluator 11 for further processing.

The pulse edges required to actuate the flip-flops 3, 8 and 9 are derived from a timing generator 5. The generator 5 produces a pulse train at four times to clock pulse frequency. The frequency of that pulse train is divided in half in a first frequency divider 6, and is again divided in half in a second frequency divider 7. Dividers 6 and 7 can be constituted by suitably connected flip-flops. The generator 5 is synchronized with the received bit current by means of a known arrangement (not shown) in such a manner that the positive edges of the clock pulses emitted by the output Q of the frequency divider 7, which are utilized for scanning in the primary signal path always lie in the center of the received bits.

For scanning of the bits in the secondary signal path, a trigger signal at twice the scanning clock pulse frequency is available at the output Q of the frequency divider 6. The positive edges of this double frequency signal are offset ¼ bit period with respect to the positive edge of the single clock pulse frequency at the output Q of the frequency divider 7.

Figure 4:
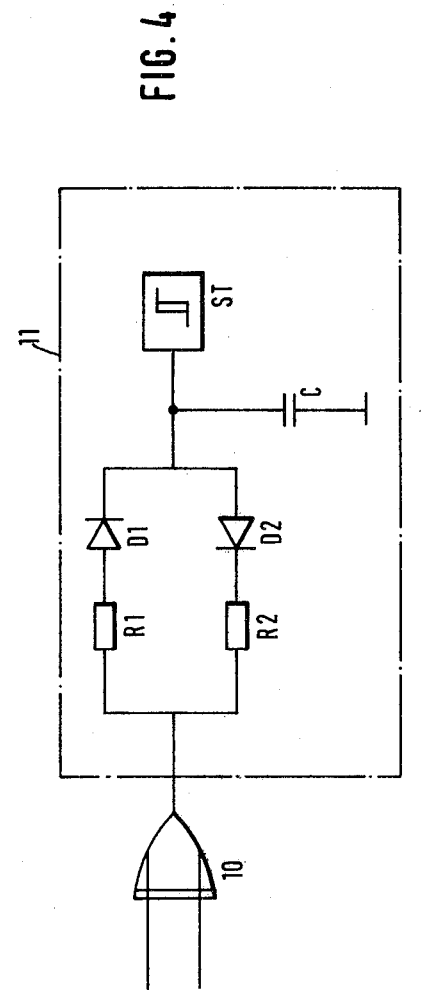
FIG. 4 shows a possible realisation of an evaluator circuit (position 11 in FIG. 3).

The evaluator M may be composed of a simple integrator circuit (R1, R2, D1, D2, C) and a Schmitt-trigger circuit ST as indicated in FIG. 4.

As mentioned before, each noncoincidence between main signal path and secondary signal path causes a pulse to be generated at the output of the anticoincidence circuit 10. Assuming that the output of 10 is in the "high" state during the duration of a pulse, charge is flowing to the capacitor C through R1 and D1 with each pulse. During the intervals between pulses the output of 10 is in the "low" state and the capacitor C is discharging through R2 and D2.

If the values of R1, R2 and C are expediently chosen, a voltage will build up across the capacitor C the mean value of which is a direct measure for the pseudo error rate. The voltage may be monitored by means of the Schmitt-trigger circuit ST.

It will be understood that the above description present invention is susceptible to various modifications, changes and adaptions, and the same are intended to be comprehended within the meaning and range of equivalents of the appended claims.

What is claimed is:

1. In a method for monitoring the bit error rate of digital signals according to the pseudo error rate technique which includes effecting an optimal regeneration of the signal elements in a main signal path by sampling each signal element in that path, and effecting a degraded regeneration of the signal elements in a secondary signal path, the improvement wherein said step of effecting regeneration in the secondary signal path comprises: sampling each signal element twice to determine its value, once a fraction of half the element period before the midpoint of the element period and once the same fraction of half the element period after the midpoint of the element period, the two sampling moments being rigidly coupled together in time; comparing the result of each of the two samplings of one element in the secondary signal path with the result of the sampling of the same element in the main signal path; and utilizing the number of disagreements occurring during said step of comparing over a given time interval as a measure for the bit error rate in the main signal path.

2. Method as defined in claim 1 wherein said steps of sampling are carried out under control of a clock pulse having a frequency corresponding to the digital signal bit rate, and further comprising generating the clock pulse by means of a generator generating pulses at a rate equal to an even number multiple of the clock pulse frequency, and subjecting the generator pulses to a frequency division.

* * * * *